(12) United States Patent
Matsuda

(10) Patent No.: US 9,076,103 B2
(45) Date of Patent: Jul. 7, 2015

(54) DEVICE MANAGEMENT SYSTEM WHICH COOPERATES WITH A POWER MANAGMENT SYSTEM FOR MANAGING POWER CONSUMPTION CONSUMED BY A PLURALITY OF ELECTRONIC DEVICES, CONTROL METHOD FOR DEVICE MANAGEMENT SYSTEM, AND STORAGE MEDIUM

(71) Applicant: CANON KABUSHIKI KAISHA, Tokyo (JP)

(72) Inventor: Kotaro Matsuda, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 43 days.

(21) Appl. No.: 13/947,595

(22) Filed: Jul. 22, 2013

(65) Prior Publication Data
US 2014/0036306 A1  Feb. 6, 2014

(30) Foreign Application Priority Data

Aug. 3, 2012  (JP) .................................. 2012-173271

(51) Int. Cl.
*G06F 3/12* (2006.01)
*H04N 1/00* (2006.01)
*G06K 15/00* (2006.01)

(52) U.S. Cl.
CPC .......... *G06K 15/4055* (2013.01); *G06F 3/1221* (2013.01); *G06F 3/1273* (2013.01); *G06F 3/1288* (2013.01); *Y02B 60/1271* (2013.01); *H04N 1/00344* (2013.01); *H04N 1/00899* (2013.01); *H04N 2201/0094* (2013.01)

(58) Field of Classification Search
CPC .......... G03G 15/5004; G06K 12/4055; G06K 15/4055; H04N 1/00034; H04N 1/00068; H04N 1/00899; G06F 3/1221
USPC .......................... 358/1.13, 1.14, 1.15; 702/61
See application file for complete search history.

(56) References Cited

U.S. PATENT DOCUMENTS

| | | | |
|---|---|---|---|
| 6,476,728 B1 * | 11/2002 | Sakakibara | 340/870.02 |
| 7,221,467 B2 * | 5/2007 | Hayashi et al. | 358/1.15 |
| 7,965,399 B2 * | 6/2011 | Miyamoto | 358/1.14 |

(Continued)

FOREIGN PATENT DOCUMENTS

| | | |
|---|---|---|
| EP | 2503344 A1 | 9/2012 |
| JP | 2012-53499 A | 3/2012 |

OTHER PUBLICATIONS

German Office Action issued in counterpart application No. 102013214641.8 dated Apr. 4, 2014, along with its English-language translation—14 pages.

*Primary Examiner* — Dov Popovici
(74) *Attorney, Agent, or Firm* — Fitzpatrick, Cella, Harper & Scinto

(57) ABSTRACT

A device management system that manages specific information for specifying a plurality of image forming apparatuses that are the object of management, manages identification information corresponding to the image forming apparatus by association with the specific information, requests information related to power consumption of the image forming apparatus from the power management system by use of the identification information that is managed by a second management unit and manages information related to acquired power consumption by association with the specific information for the image forming apparatus.

9 Claims, 22 Drawing Sheets

(56) References Cited

U.S. PATENT DOCUMENTS

| | | | |
|---|---|---|---|
| 7,992,028 B2* | 8/2011 | Smith | 713/340 |
| 8,493,577 B2* | 7/2013 | Morimoto | 358/1.13 |
| 8,823,958 B2* | 9/2014 | Miyamoto | 358/1.13 |
| 8,860,976 B2* | 10/2014 | Kodama | 358/1.14 |
| 2004/0148529 A1* | 7/2004 | Cantwell | 713/300 |
| 2004/0246512 A1* | 12/2004 | Miyamoto | 358/1.13 |
| 2008/0246993 A1* | 10/2008 | Murakami et al. | 358/1.15 |
| 2010/0070216 A1* | 3/2010 | Murata | 702/61 |
| 2011/0194134 A1* | 8/2011 | Miyamoto | 358/1.13 |
| 2012/0053868 A1 | 3/2012 | Matsumoto | 702/61 |
| 2012/0245752 A1 | 9/2012 | Borrett et al. | |
| 2013/0031385 A1 | 1/2013 | Seto | |

* cited by examiner

FIG. 5A

| Table name | Device information management table | | |
|---|---|---|---|
| Device serial ID | Manufacturer name | Model name | ... |
| NNN000001 | ABCDE | C5185 | ... |
| MMM000009 | ABCDE | L3500 | ... |

| Table name | Device IC chip information management table |
|---|---|
| IC chip ID | Device serial ID |
| 00000000-1111-2222-3333-aaaabbbbcccc | NNN000001 |
| 00000000-1111-2222-3333-ddddeeeeffff | MMM000009 |

| Table name | Tenant management table | | |
|---|---|---|---|
| Tenant ID | Tenant type | Tenant name | ... |
| AAA00001 | Sales tenant | XYZ Commerce LLC. | ... |
| AAA00002 | Client tenant | PQR Electronics LLC. | ... |

| Table name | User management table | |
|---|---|---|
| User ID | User name | ... |
| XXX@AAA00001 | XXX YYY | ... |
| YYY@AAA00002 | YYY ZZZ | ... |
| ZZZ@AAA00002 | ZZZ ZZZ | ... |

| Table name | Role management table | |
|---|---|---|
| User ID | Tenant ID | Role |
| XXX@AAA00001 | AAA00001 | Seller |
| XXX@AAA00001 | AAA00002 | Client tenant operator |
| YYY@AAA00002 | AAA00002 | Management user within client tenants |
| ZZZ@AAA00002 | AAA00002 | General user within client tenants |

| Table name | Tenant data management table [AAA00002] |
|---|---|
| Key | Value |
| PowerLogRetrieval_URL | http://xxx.yyy.zzz |
| PowerLogRetrieval_LoginId | P1000001 |
| PowerLogRetrieval_LoginPassword | yyyyyyyyyyyy |
| PowerLogRetrieval_Interval | 1:00:00 |

| Table name | Device management table [AAA00002] | | | |
|---|---|---|---|---|
| Device serial ID | Manufacturer name | Model name | Device type | Color type |
| NNN000001 | ABCDE | C5180 | MFP | CL |
| MMM000009 | ABCDE | L3500 | SFP | BW |

Device group management table [AAA00002]

| Table name | | | | |
|---|---|---|---|---|
| Device serial ID | First device group | Second device group | Third device group | Device group record date time |
| NNN000001 | New York head office | Building A | Room 803 | 2012/01/06 13:22:42 |
| MMM000009 | New York head office | Building B | Room 304 | 2012/04/15 18:02:34 |
| 811 | 812 | 813 | 814 | 815 |

Device group archive table [AAA00002]

| Table name | | | | | |
|---|---|---|---|---|---|
| Device serial ID | First device group | Second device group | Third device group | Device group record date time | Device group record release date time |
| MMM000009 | New York head office | Building B | Room 207 | 2012/02/01 09:51:03 | 2012/04/15 18:02:34 |
| 821 | 822 | 823 | 824 | 825 | 826 |

Device data updating date time table [AAA00002] — 900

| Table name | | |
|---|---|---|
| Device serial ID | Data type | Final data updating date time |
| NNN000001 | Count and job log | 2012/05/13 02:04:52 |
| NNN000001 | Power amount | 2012/05/13 23:12:20 |
| 901 | 902 | 903 |

FIG. 9B

Count table [AAA00002] — 910

| Table name | | | | | | | |
|---|---|---|---|---|---|---|---|
| Device serial ID | Color print page number | Monochrome print page number | Color copy page number | Monochrome copy page number | Color scan page number | Monochrome scan page number | Count acquisition date time |
| NNN000001 | 61309 | 29212 | 3019 | 987 | 5989 | 1802 | 2012/05/12 2:02:26 |
| NNN000001 | 62955 | 30205 | 3121 | 1005 | 6202 | 1821 | 2012/05/13 2:04:52 |
| 911 | 912 | 913 | 914 | 915 | 916 | 917 | 918 |

FIG. 10A

Job log table [AAA00002]

| Table name | | | | | | | |
|---|---|---|---|---|---|---|---|
| Device serial ID | Job commencement date time | Job completion date time | Job name | Job executing party | Job completion code | Job type | Detailed job log ID |
| NNN000001 | 2012/05/14 14:00:11 | 2012/05/14 14:02:33 | Presentation. PDF | XYZ | 1 | Print | P00000000-000000001 |
| 1001 | 1002 | 1003 | 1004 | 1005 | 1006 | 1007 | 1008 |

Print and detailed job log table [AAA00002]

| Table name | | | | | | |
|---|---|---|---|---|---|---|
| Detailed job log ID | Print sheet number | Two-sided setting | N up setting | Color sheet number | Monochrome sheet number | Paper size |
| P00000000-000000001 | 5 | On | 4 | 8 | 2 | A4 |
| 1011 | 1012 | 1013 | 1014 | 1015 | 1016 | 1017 |

| Table name | Scan and detailed job log table [AAA00002] | | | | | |
|---|---|---|---|---|---|---|
| Detailed job log ID | Paper size | Color sheet number | Monochrome sheet number | File format | Address | ... |
| S00000000-000000001 | LTR | 3 | 7 | PDF | Email: xxx@yyy | ... |
| 1021 | 1022 | 1023 | 1024 | 1025 | 1026 | |

| Table name | Power amount log table [AAA00002] | | |
|---|---|---|---|
| Device serial ID | Object period commencement date time | Object period completion date time | Power consumption amount (Wh) |
| NNN000001 | 2012/05/14 15:00:00 | 2012/05/14 16:00:00 | 66.2 |
| NNN000001 | 2012/05/14 16:00:00 | 2012/05/14 17:00:00 | 39.1 |
| 1101 | 1102 | 1103 | 1104 |

FIG. 12A

Tenant tallying setting table [AAA00002] — 1200

| Table name | | |
|---|---|---|
| Year commencement month | Daily closing time | Monthly closing time |
| 1 | 0:00 | 25 |
| | 1202 | 1203 |

| Applied time zone | tallying commencement standby time |
|---|---|
| America/New York | 6:00:00 |
| 1204 | 1205 |

Count and job log tallying table [AAA00002] — 1210

| Table name | | | | | | |
|---|---|---|---|---|---|---|
| Device serial ID | Tallying unit | Tallying object year | Tallying object month | Tallying object day | Tallying completion date time | Tallying status number |
| NNN000001 | Date | 2012 | 04 | 24 | 2012/04/25 6:01:22 | 1 |
| NNN000001 | Date | 2012 | 04 | 25 | 2012/04/26 6:03:50 | 2 |
| NNN000001 | Month | 2012 | 04 | | 2012/04/26 6:06:18 | N/A |
| 1211 | 1212 | 1213 | 1214 | 1215 | 1216 | 1217 |

Count and job log tallying table [AAA00002]

| Table name | | | | | | |
|---|---|---|---|---|---|---|
| Device serial ID | Tallying object month | Total print sheet number | One-sided print sheet number | Two-sided print sheet number | N up use ratio (%) | Color use ratio (%) |
| NNN000001 | 2012/05/14 | 656 | 420 | 236 | 12 | 65 |
| 1301 | 1302 | 1303 | 1304 | 1305 | 1306 | 1307 |

Power amount tallying table [AAA00002]

| Table name | | |
|---|---|---|
| Device serial ID | Tallying object date | Power consumption amount (Wh) |
| NNN000001 | 2012/05/14 | 3026.5 |
| 1311 | 1312 | 1313 |

| Table name | Power point connection event record table | | | |
|---|---|---|---|---|
| Event occurrence date time | Reader ID | Power point ID | IC chip ID | Occurred event |
| 2012/05/14 10:24:11 | R-000-11111 | C-000-11111 | 00000000-1111-2222-3333-aaaabbbbcccc | Connection completed |
| 2012/05/29 19:55:39 | R-000-11111 | C-000-11111 | 00000000-1111-2222-3333-aaaabbbbcccc | disconnection |
| 1401 | 1402 | 1403 | 1404 | 1405 |

| Table name | Power amount record table | | |
|---|---|---|---|
| Power point ID | Object period commencement date time | Object period completion date time | Power consumption amount (Wh) |
| C-000-11111 | 2012/05/14 15:00:00 | 2012/05/14 15:01:00 | 3.1 |
| 1411 | 1412 | 1413 | 1414 |

| Table name | Power point disposition information table | | | |
|---|---|---|---|---|
| Power point ID | Disposition information 1 | Disposition information 2 | Disposition information 3 | Disposition information 4 |
| C-000-11111 | New York | Building A | Floor 8 | Area 03 |
| 1421 | 1422 | 1423 | 1424 | 1425 |

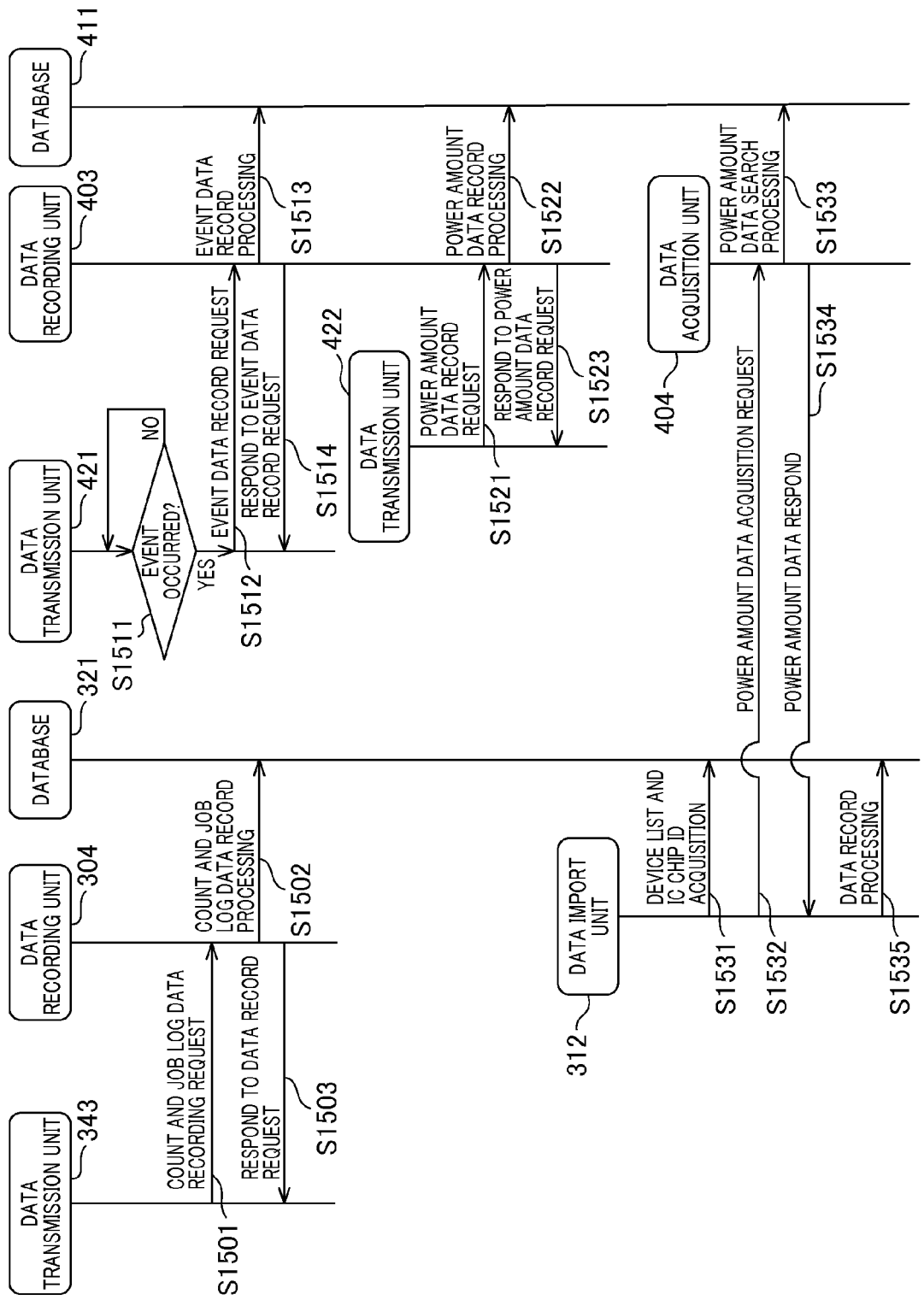

FIG. 17

| Table name | Model-specific power consumption information table | | |
|---|---|---|---|
| Model name | Standby mode power consumption (W) | Power economy 1 mode power consumption (W) | Power economy 2 mode power consumption (W) |
| C5180 | 100 | 80 | 1 |
| L3500 | 80 | 55 | 1 |

| Tallying status number | Tallying status | Tallying status meaning |
|---|---|---|
| 1 | Tallying complete | Execute tallying after completion of recording of counter and job log |
| 2 | Tallying complete | Count and job log for part of period is not recorded, but determined that image forming apparatus is not used in that period based on power amount log, execute tallying only using recorded count and job log |
| 3 | Tallying complete | Determine that image forming apparatus is not used based on power amount log, execute tallying of counter increment and job number for tallying object period as 0 |
| 4 | Tallying omission | Count and job log for part of period is not recorded, use of image forming apparatus for that period is confirmed based on power amount log, and therefore tallying omission cannot be executed |
| 5 | Tallying omission | Use of image forming apparatus during tallying object period is confirmed based on power amount log, but tallying cannot be executed due to non-recording of count and job log |
| 6 | Unclear device | No count and job log during tallying object period is recorded, and no connection of power point |

FIG. 21A

Group-to-be-transferred information table [AAA00002] (2100)

| Group ID | Disposition information 1 | Disposition information 2 | Disposition information 3 | Disposition information 4 |
|---|---|---|---|---|
| G001 | New York | Building A | Floor 8 | Area 03 |
| G002 | New York | Building B | Floor 3 | Area 04 |

Transferred-group information table [AAA00002] (2110)

| Group ID | First device group | Second device group | Third device group |
|---|---|---|---|
| DG001 | New York head office | Building A | Room 803 |
| DG002 | New York head office | Building B | Room 304 |

Conversion information table [AAA00002] (2120)

| Group-to-be-transferred group ID | Transferred group ID |
|---|---|
| G001 | DG001 |
| G002 | DG002 |

2121  2122

DEVICE MANAGEMENT SYSTEM WHICH COOPERATES WITH A POWER MANAGMENT SYSTEM FOR MANAGING POWER CONSUMPTION CONSUMED BY A PLURALITY OF ELECTRONIC DEVICES, CONTROL METHOD FOR DEVICE MANAGEMENT SYSTEM, AND STORAGE MEDIUM

BACKGROUND OF THE INVENTION

1. Field of the Invention

The present disclosure relates to a technique configured to manage power consumption of an electrical device.

2. Description of the Related Art

A management system has been proposed that is configured to manage an image forming apparatus such as a printer, a multifunction peripheral for office use, or the like. This management system manages a plurality of image forming apparatuses installed in an organizational environment such as a company, group, or the like to thereby enable comprehension of the use state of the respective image forming apparatuses. For example, the number of pages used by respective functions such as copying, scanning, printing of the respective image forming apparatuses is recorded by counting to thereby enable use as charging information by collection and tallying of a count value that has been counted. Furthermore, a more detailed job log from the respective image forming apparatuses enables detailed analysis of a job, such as the ratio of color prints, the ratio of duplex printing, or the like. In recent years, in order to reduce the total costs of ownership (TCO) for a customer, the importance of device management applications has increased both for a customer, and for distributers who sell multifunction peripherals, printers, or the like. This is due to the fact that such applications have become a support tool for accurately comprehending the use state or implementation state of an image forming apparatus, consequently managing an image forming apparatus at a suitable cost.

On the other hand, in recent years, the technical development of smart grids has progressed in various fields as an intelligent power network. Although a conventional power network only supplies power, current implementations attempt to reduce costs, reduce power consumption, improve power use efficiency by configuring a communication function in power meters, power devices or the like to thereby enhance input and output of information and commands.

A power point technique has been used that applies a non-contact IC card techniques adapted to a smart grid. An IC chip is provided on the electrical device side and an IC card reader is provided on the power point side. When a plug is inserted into the power point, information in the IC chip is read out. Thus, by recording device-specific information in the IC chip, the presence/absence of a power point connection or the power use state for each separate device can be accurately comprehended.

The management system has the function of tallying the power consumption of respective image forming apparatuses in addition to collecting and tallying the job log and the count value. The demand for a reduction in environmental loads has led to the need for accurate comprehension of how much energy is consumed during operation of an image forming apparatus. Japanese Patent Application Laid-Open No. 2012-53499 discloses a management apparatus that measures the power consumption of an image forming apparatus by use of the job log and the operating state of the image forming apparatus, or the like.

The management system tallies a count value, job log, power consumption amount or the like on the basis of a unit such as daily, monthly, by image forming apparatus unit, by device group, or the like, and produces a report. A client-server configuration is disclosed as a provision configuration for a management system. A plurality of image forming apparatus groups is managed by installing and executing a device management application on a server. The tallying of a count value or job log on a server requires periodical transmission of a count value or job log by the image forming apparatus to a server. Furthermore, the calculation of a daily or monthly tallying value requires setting of a tallying closing time or tallying closing date. For example, when data is summarized during the same day using a daily tallying, the time 0:00:00 each day is set as the tallying closing time. Furthermore, when the data from the $26^{th}$ day of an immediately previous month to the $25^{th}$ day of the current month is taken as a monthly tallying object, the $25^{th}$ day of each month is the tallying closing date.

As described above, when data is transmitted to a server by respective image forming apparatuses in a client-server configuration, data transmission processing is required at least once daily. If it is assumed that an image forming apparatus is not used on a non-working holiday, in the absence of a report to the server side from the respective image forming apparatuses, it is not possible to determine whether or not use has occurred. As a result, even when there is no use of the image forming apparatus, data transmission processing is performed by the image forming apparatus to the server, and the server records the final updating date time of the job log and the count value. In this manner, although it cannot be determined whether or not the image forming apparatus has been used, a tallying process in relation to the tallying closing date or the tallying closing time can be executed since the collection of job logs or count information that indicates the respective types of count values that have completed by the final update date time can be determined.

For example, for the purposes of energy efficiency, an image forming apparatus is assumed that is temporarily placed in a non-operational configuration (power OFF) by removal from the power point for example. Furthermore, when in an operational configuration (power ON), since the network is offline, it is assumed that the image forming apparatus cannot perform data transmission processing to the server. Since the image forming apparatus above does not execute data transmission, the server can only comprehend the situation that the image forming apparatus does not exhibit a final update.

The purpose of the management system is to comprehend the use state of the image forming apparatus. Therefore, in order to actually execute tallying and report, the server must examine the state of each image forming apparatus unit that does not exhibit a final update, and omit the non-operational image forming apparatus from the tallying object settings. Furthermore, the network of the network-offline image forming apparatus must be restored, and processing is required to send the data.

Even when there has been no use at all of the image forming apparatus after the final updating date time resulting from the previous execution of data transmission processing, data transmission processing is required to record the final updating date time as described above. However, when there is no use, although the image forming apparatus is generally operated in energy efficient mode, notwithstanding the fact that there is no count or data updating of the job log, power economy mode is released and transmission processing must be performed in order to record the final updating date time.

Therefore, it is desirable to suppress the occurrence of transmission processing and power use resulting from release of the power economy mode.

The management apparatus disclosed in Japanese Patent Application Laid-Open No. 2012-53499 stores the power consumption required for each job, and calculates the power used by the image forming apparatus from the job history. However, the calculated power consumption actually a theoretical power consumption estimation value, and there is an error from the power that is actually used by the image forming apparatus. Furthermore, calculation of power consumption is based on the collection of log information such as a job log or the like, and therefore does not provide a solution to the above cases.

SUMMARY OF THE INVENTION

The present disclosure provides a configuration to enable acquisition from a power management system of the power consumption used by an image forming apparatus, and suitable performance of updating and management of the power consumption.

The device management system according to a first exemplary embodiment of the present disclosure communicates through a network with a power management system that is associated with identification information configured to identify a configuration for power supply respectively to a plurality of electronic devices including an image forming apparatus to thereby manage the power consumption consumed by the plurality of electronic devices. The device management system includes a first management means configured to manage specific information for specifying the plurality of image forming apparatuses that are the object of management, a second management means configured to manage identification information corresponding to the image forming apparatus by association with the specific information, a request means configured to request information related to power consumption of the image forming apparatus from the power management system by use of the identification information that is managed by the second management means, and a third management means configured to manage information related to power consumption acquired by the request means by association with the specific information for the image forming apparatus.

Further features of the present disclosure will become apparent from the following description of exemplary embodiments with reference to the attached drawings.

BRIEF DESCRIPTION OF THE DRAWINGS

FIG. 5A and FIG. 5B respectively illustrate a device information management table and a device IC chip information management table.

FIG. 6A to FIG. 6C respectively illustrate a tenant management table, a user management table, and a role management table.

FIG. 7 illustrates a tenant data management table.

FIG. 8A to FIG. 8C illustrate a device management table, a device group management table, and a device group archive table.

FIG. 9A and FIG. 9B illustrate a device data update date time table, and a count table.

FIG. 10A to FIG. 10C respectively illustrate a job log table, a print and detailed job log table, and a scan and detailed job log table.

FIG. 11 illustrates a power amount log table.

FIG. 12A and FIG. 12B illustrate a tenant tallying setting table, and a count and job log tallying result table.

FIG. 13A and FIG. 13B illustrate a count and job log tallying table, and a power amount tallying table.

FIG. 14A to FIG. 14C respectively illustrate a power point connection event record table, a power amount record table, and a power point disposition information table.

FIG. 15 illustrates a sequence figure that describes the flow of data record processing.

FIG. 17 illustrates a model-specific power consumption information table.

FIG. 20 illustrates an explanatory table of the tallying status numbers.

FIG. 21A to FIG. 21C respectively illustrate a group-to-be-transferred information table, a transferred-group information table, and a conversion information table.

DESCRIPTION OF THE EMBODIMENTS

Figure 1:
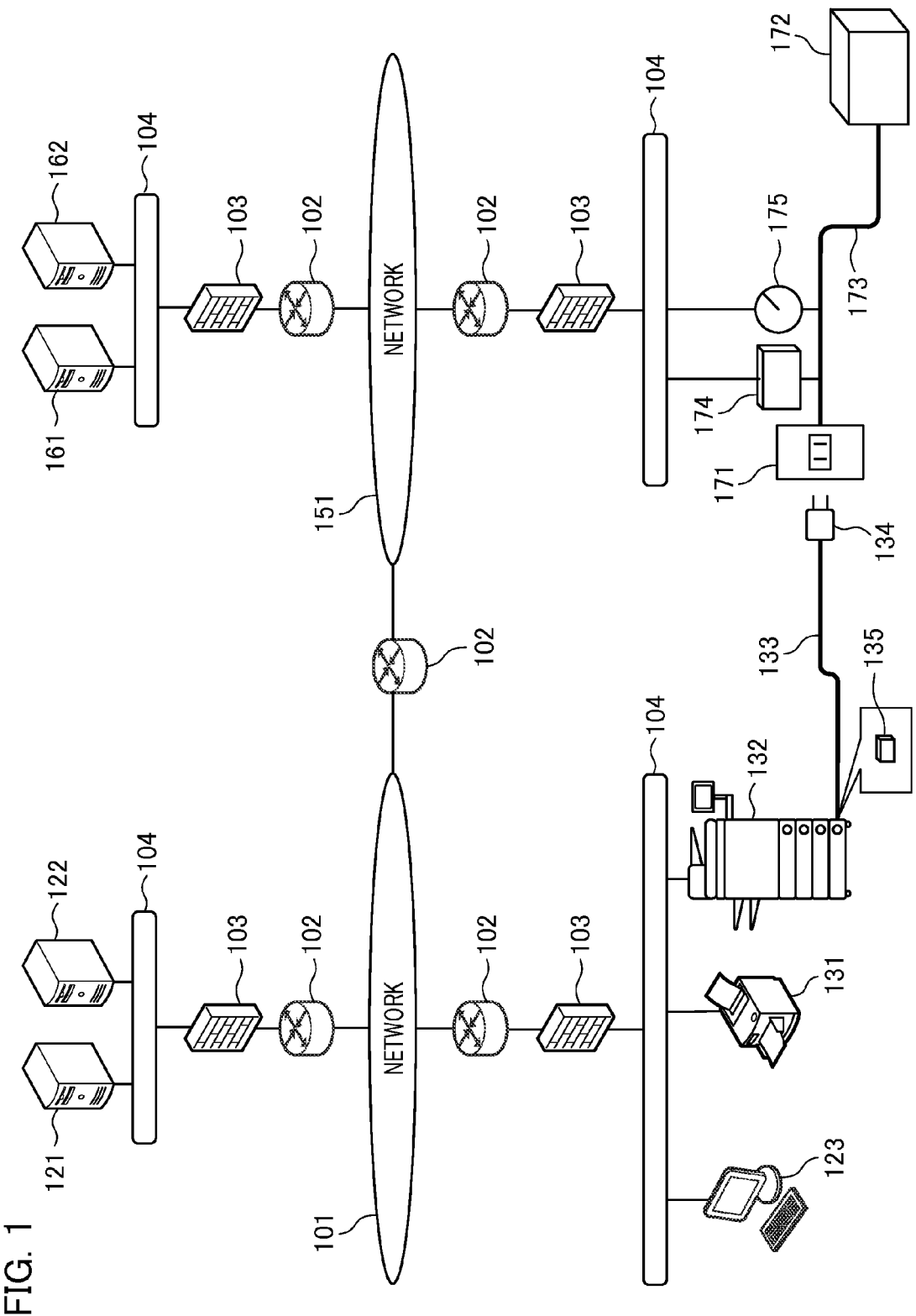
FIG. 1 illustrates a management system configuration example according to a first exemplary embodiment.

FIG. 1 illustrates a configuration example of a management system according to the present disclosure. The management system includes a device management system and a power management system. The device management system includes device management servers 121, 122, a client computer 123, and an image forming apparatus such as a printer 131 or a multifunction peripheral 132, or the like. The device management server 121, 122 is a server that executes an arbitrary application or database, or the like, and can communicate with a client computer 123, and a printer 131 or multifunction peripheral 132 through a network 101. The client computer 123 is connected with the printer 131 or the multifunction peripheral 132 through a local area network (LAN) 104. The following description will focus on the image forming apparatus 132. The image forming apparatus 132 includes an IC chip 135. The image forming apparatus 132 is connected to the power point 171, that is the power source, through an insertable plug 134.

The power management system includes power management servers 161, 162, a power supply apparatus 172, a power cable 173, an IC chip reader 174, and a power meter 175. The power management system is a management system on the smart grid side that manages power in the respective types of electronic devices. Naturally, the electronic devices include an image forming apparatus, or the like. The power management server 161, 162 is a server that executes an arbitrary application, database, or the like, and acquire data from the IC chip reader 174 and the power meter 175 through the network 151. The IC chip reader 174 and the power meter 175 are connected by the LAN 104. When a user connects the insertable plug 134 with a power point 171, information in the IC chip 135 mounted in the image forming apparatus 132 is read by the reader 174. When power is supplied to the power point 171 from the power supply apparatus 172, the used power amount is measured by the power meter 175.

The network 101 and the network 151 are networks that indicate the Internet or an intranet. The network device 102 is a router, a switch, or the like, and connects both networks. As illustrated in FIG. 1, the network 101 and the network 151 are connected through the network device 102, and enable mutual communication. The firewall 103 performs control to enable communication between the networks. Although the LAN 104 is a network of the terminal that connects a device such as a computer or the like, there is no limitation to a cable communication network, and the network includes a wireless communication network such as a wireless LAN, a mobile telephone communication network, or the like.

Figure 2:
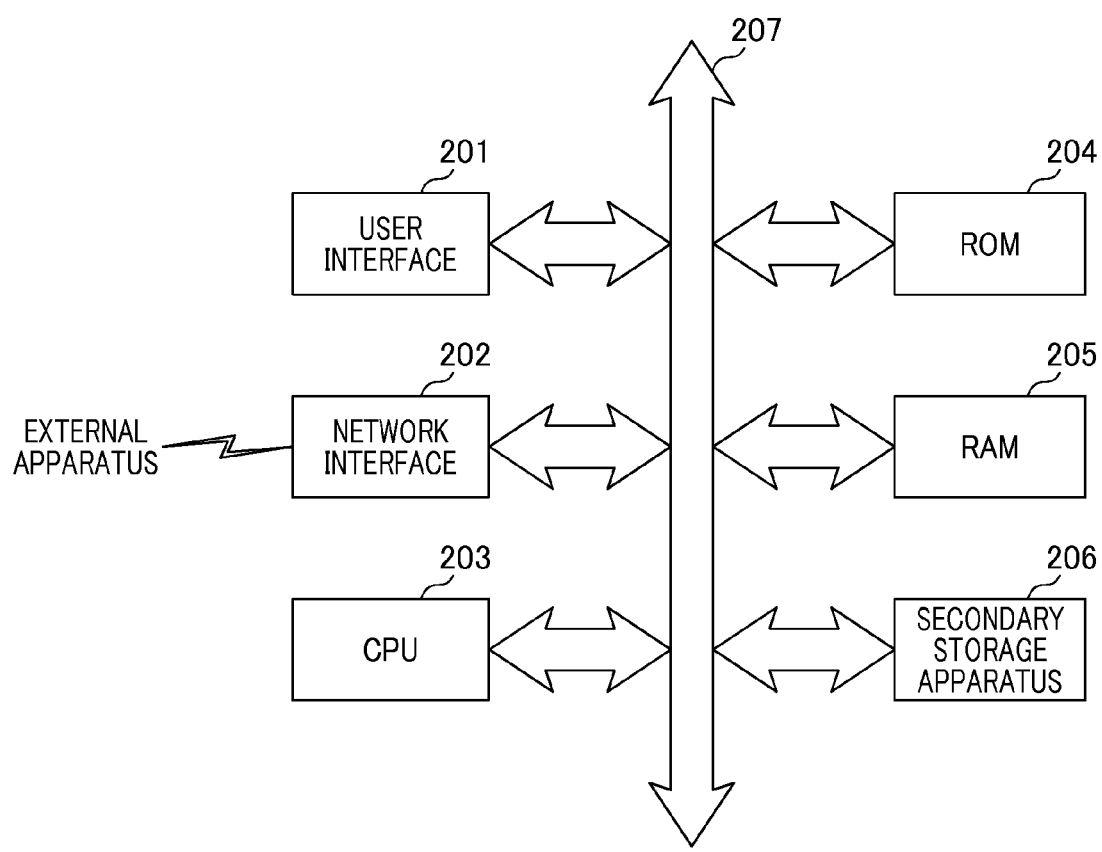
FIG. 2 illustrates a hardware configuration example of a print server and an apparatus configuring the management system.

FIG. 2 illustrates a theoretical configuration of the information processing function of a device management server 121, 122, a power management server 161, 162, a client computer 123, and an image forming apparatus 132. The user interface 201 executes input and output of information through a display, keyboard, mouse, touch panel, or the like. A computer that does not include the above hardware can be connected and operated from another computer by a remote display, or the like. The network interface 202 executes communication with another computer or network device by connection with a network such as a LAN or the like. The read only memory (ROM) records the various types of preinstalled programs and data. The random access memory (RAM) is a temporary memory area. A secondary storage apparatus 206 is for example an HDD. The central processing unit (CPU) 203 executes a program that is read from ROM 204, RAM 205, the second storage apparatus 206 or the like. The respective units are connected through the input/output interface 207.

Figure 3:
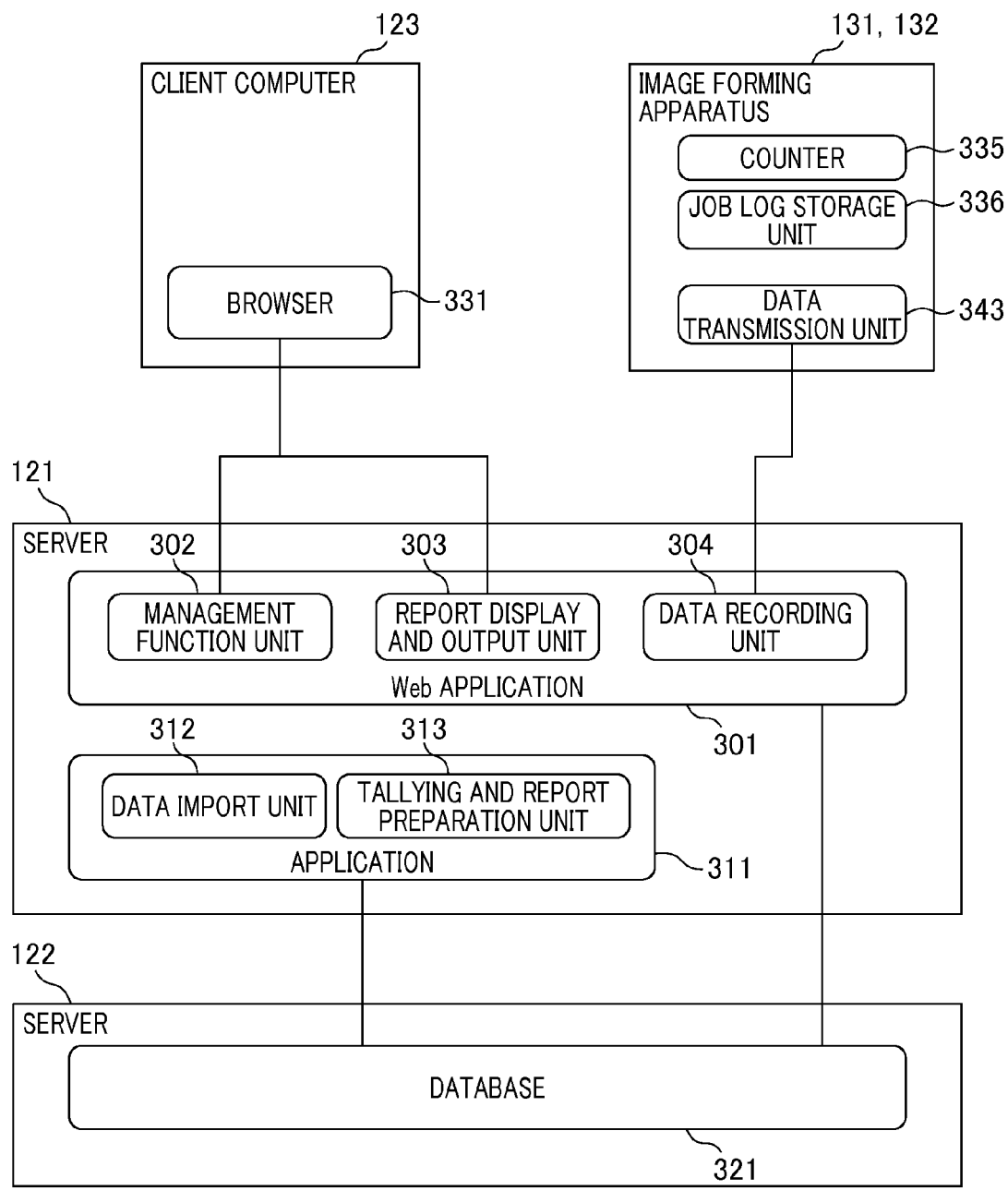
FIG. 3 illustrates a software configuration of a device management system.

FIG. 3 illustrates the software configuration of the device management system, and the state of interconnections realized through the network. The device management server 121 of the device management system includes a Web application 301 and an application 311. The Web application 301 includes a management function unit 302, a report display and output unit 303, and a data reporting unit 304 that realize the respective functions of the device management application. The application 311 includes a data import unit 312, and a tallying and report preparation unit 311. The Web application 301 executes processing to respond from the client computer 123 or the image forming apparatus 132 to the Web request. The application 311 is configured with a different method of execution from the Web application and is executed on the scheduled date time, or executed in response to a trigger such as the completion of another process. An application termed a device management application coordinates the Web application 301 and the application 311. The management server 122 includes a database 321. The Web application 301 and the application 311 record data in the database 321, and read out data as required for the purposes of searching, tallying, or the like.

The application 123 includes a browser 331. A user that uses the device management application executes the data management function provided by the management function unit 302, and the other management functions through the browser 331. In the same manner, the user accesses the report display and output unit 303 through the browser 331, displays the report or tallying results prepared by the device management application, and downloads the same as a file.

The image forming apparatus 132 includes a counter 335, a job log recording unit 336, and a data transmission unit 343.

The counter 335 records the number which respective functions of the image forming apparatus 132 have been used. For example, the counter 335 records the page number that have been used by the copying or scanning function, or the page number that have been used by the print function. The job log recording unit 336 records detailed information such as the print job, the copying job, or the scan job, or the like executed by the image forming apparatus. The data recording unit 304 receives data of the job or the page number recorded by the job log recording unit 336 and the counter 335, and records the same in the database 321. In the present specification, data for the job or the page number recorded in the job log recording unit 336 and the counter 335 are termed log information. The recorded data is processed by the tallying and report preparation unit 313, and is provided to the user by the report display and output unit 303 through the browser 331. The report is a data file that collects the summarized values, and for example is a CSV. Furthermore, when expressing the tallying values by use of a table, graph, or the like, a data file of an office application, a PDF, or the like may be used. This is configured as a cycle of data recording, tallying processing, and report provision to a user from the image forming apparatus in the device management system.

Figure 4:
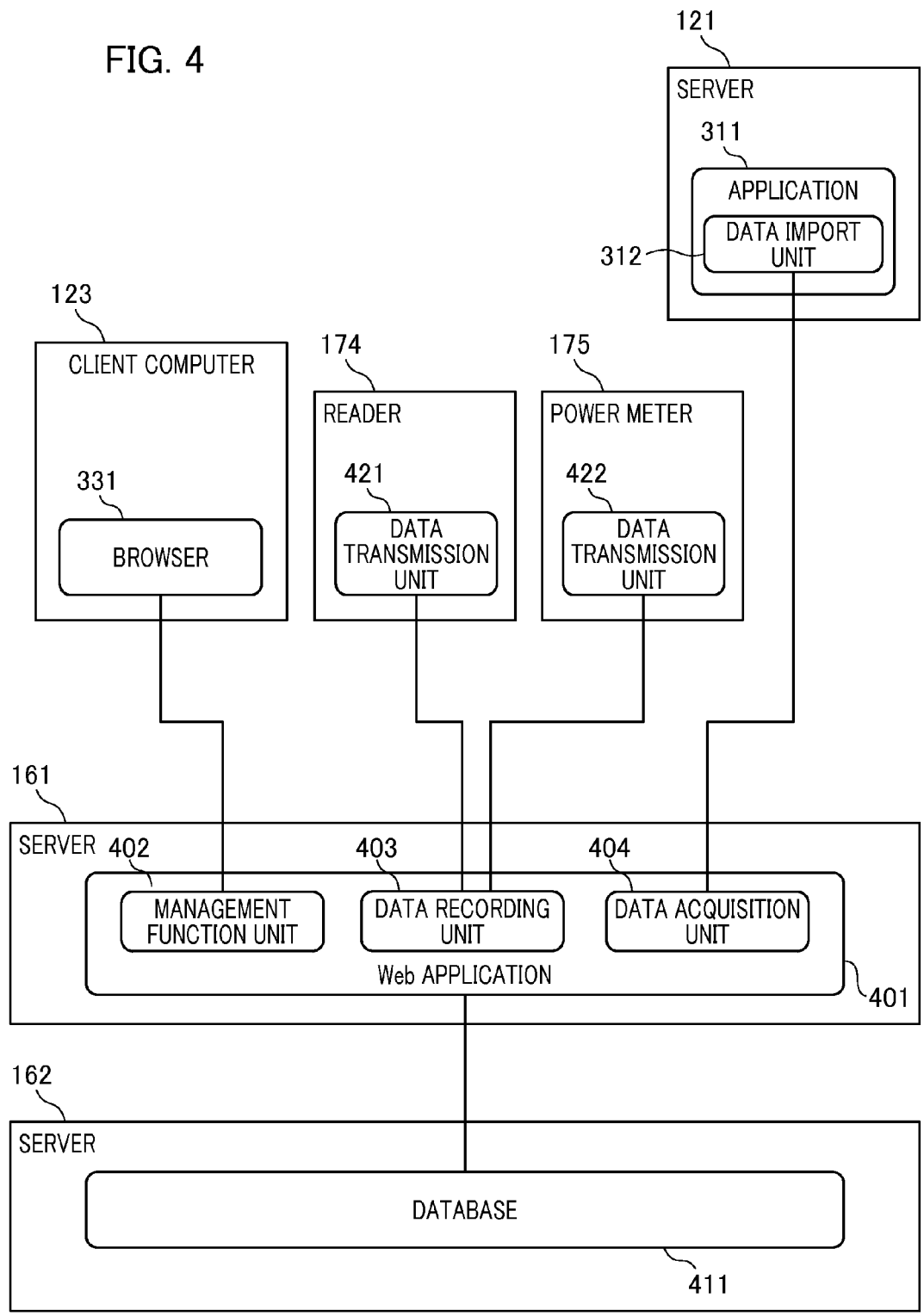
FIG. 4 illustrates a software configuration of a power management system.

FIG. 4 illustrates the software configuration and state of interconnections for execution of the power device management application on the smart grid side. The power management server 161 includes a Web application that is executed by the server 161 that is the entity of the power device management application. The Web application 401 includes a management function unit 402, a data recording unit 403, and a data acquisition unit 404. The power management server 162 includes an actual database 411. A user executes the required data management function by use of the management function unit 402 through the browser 311. The reader 174 includes a data transmission unit 421, and transmits data or the like such as the IC chip ID or the device serial ID read from the reader IC chip 135, or the like through the data transmission unit 421 to the data recording unit 403. The power meter 175 is provided with a data transmission unit 422, measures the power that is supplied to the power point 171, and transmits data to the data recording unit 403 through the data transmission unit 422. The data recording unit 403 records the received data in the database 411. The data import unit 312 is connected to the data acquisition unit 404 to thereby acquire the required data.

FIG. 5 to FIG. 13 illustrate data tables for the database 321. FIG. 5 illustrates an example of a device information management table 500 and a device IC chip information management table 510. The device information management table 500 illustrated in FIG. 5A includes columns for storage of the device serial ID 501, the manufacturer name 502, the model name 503 as specific information to specify the image forming apparatus. The device information management table 500 may include a column for storage of the address of the image forming apparatus. The device serial ID is the unique ID for identifying the individual image forming apparatus that is the object of management processing. When the device serial ID is known, the model name of the image forming apparatus can be specified. The specific information to specify the image forming apparatus may be at least any of serial information, address information, and model information for the image forming apparatus.

The device IC chip information management table 510 illustrated in FIG. 5B includes columns for storage of the IC chip ID 511 and the device serial ID 512. The IC chip ID recorded in the IC chip 135 mounted in the image forming apparatus is the unique ID for identifying the individual IC chips. That is to say, the IC chip ID is the identification information for identification of the electronic device. When the IC chip ID is known as a result of management in the information management table 510 by association of mapping of the IC chip ID with the device serial ID, it is possible to specify the device serial ID of the image forming apparatus.

FIG. 6A to FIG. 6C illustrate an example of a tenant management table 600, a user management table 610, and a role management table. The device management application is not limited to a single client, and for being used by a plurality of clients, a so-called "multitenant" configuration is required. Although the "multitenant" configuration shares devices such as the server, the application, the database, or the like, the configuration internally executes a logical separation in relation to data for each client, and is operated so that the data is not mutually visible. The tenant management table 600 illustrated in FIG. 6A is a table that forms the basis of the management of the multitenant, and includes a column for storage of the tenant ID 601, the tenant type 602, and the tenant name 603. The tenant ID 601 allocates a unique ID for each tenant. The tenant type 602 is allocated as either a sales tenant or a client tenant. The tenant name 603 is allocated as the name of either a sales tenant or a client tenant.

The user management table illustrated in FIG. 6B includes a column for storage of the user ID 611 and the user name 612. The user ID 611 may allocate a unique ID for each user.

The role management table 620 illustrated in FIG. 6C includes columns for storage of a user ID 621, a tenant ID 622, and a role 623. For example, a user such as XXX@AAA00001 includes a role of a seller of tenant ID: AAA00001, and can manage the client tenant. The user has the role of client tenant operator in relation to tenant ID: AAA00002, and is permitted to perform operation in relation to this client tenant. A role for management users within the client tenants is allocated to the user indicated by YYY@AAA00002, and the user is permitted to operate the management function of the client tenant. A role for general users within the client tenants is allocated to the user indicated by ZZZ@AAA00002, and the user is permitted to operate general functions other than the management function of the client tenant. In this manner, the role management table 620 manages what kind of rights is permitted to each user in relation to each tenant.

FIG. 7 illustrates a tenant data management table 700. When [AAA00002] is described after the table name, the logical separation of the data into respective tenants is indicated in accordance with the configuration of the multitenant described above by the table. Furthermore, the tenant data management table 700 indicates that data is attributed to the tenant having tenant ID: AAA00002. The method of notation is the same in the tables described below. The information related to the job includes a column configured to store the key 701 and the value 702 of the tenant data. As used herein, the stored data includes the URL of the data acquisition unit 404, the login ID, the login password, and the data acquisition interval that are configured for acquisition of power data from the smart grid.

FIG. 8A to FIG. 8C illustrate a device management table 800, a device group management table 810, and a device group archive table 820. The device management table 800 illustrated in FIG. 8A includes columns for storage of a device serial ID 801, a manufacturer name 802, a model name 803, a device type 804, and a color type. The device type 804 is stored as MFP that indicates a multifunction peripheral, SFP that indicates a single function printer, or the like. The color types 805 are stored as CL that indicates a color function, or BW that indicates a monochrome function, or the like.

The device group management table 810 illustrated in FIG. 8B includes columns for storage of a device serial ID 811, a first, second, third device group 812, 813, 814, and a device group recording date time 815. In the present example, the first device group 812 indicates a division into groups by location, the second device group 813 indicates a division into groups by a building in a location, and the third device group 814 indicates a division into groups by a room in the building. The device group recording date time 815 indicates the date time on which the image forming apparatus 132 that has the relevant device serial ID commenced the attribution into device groups.

The device group archive table 820 illustrated in FIG. 8C includes the columns 821 to 825 that are the same as the columns 811 to 815 in the device group management table 810, and the device group recording release date time 826. The device group recording release date time 826 is the date time on which the image forming apparatus 132 that has the relevant device serial ID released the attribution from the device group. That is to say, the device group management table 810 indicates the current device group configuration, and the device group archive table 820 indicates an historical device group configuration.

FIG. 9A and FIG. 9B illustrate a device data update date time table 900, and a count table 910. The device data update date time table 900 illustrated in FIG. 9A includes columns for storage of device serial ID 910, data type 902, and final data updating date time 903. The data type 902 stores either the power amount acquired from the smart grid or the count job log that is collected from the image forming apparatus. The final data updating date time 903 stores the time date of completion of collection of the power amount or the count job log of the image forming apparatus that has the relevant device serial ID. That is to say, the collection of the count and job log is completed in relation to a job that is prior to the final data updating date time 903, and the collection of the count and job log is not completed in relation to subsequent jobs. The same comments apply to the power amount.

The device serial ID 910 illustrated in FIG. 9B includes columns for storage of a device serial ID 911, and a cumulative color print page number 912. As illustrated by the columns in the count table 910, in the same manner, the columns 913 to 917 are columns configured for storage of the various types of page numbers, in addition to the monochromatic print page number. The column 918 stores the count acquisition date time. Since the value of each count is a cumulative value, the tallying and report preparation unit 313 can calculate the daily used page number and the monthly used page number by calculating the daily increment or monthly increment based on a time series calculation of the count acquisition date time 918.

FIG. 10A to FIG. 10C respectively illustrate a job log table 1000, a print and detailed job log table 1010, and a scan and detailed job log table 1020. The job log table 1000 illustrated in FIG. 10A includes columns for storage of a device serial ID 1001, a job commencement date time 1002, a job completion date time 1003, a job name 1004, a job executing party 1005, and a job completion code 1006. The job log table 1000 includes columns for storage of the job type 1007, and the detailed job log ID 1008. The job completion code 1006 is used to confirm whether the job is correctly completed, or has finished due to an abnormality. The job type 1007 stores the type such as a print, scan, copy, or the like, and records what type of job has been executed. The detailed job log ID 1008 is the link to the code in the detailed job log table for each job type as described below.

The print and detailed job log table 1010 illustrated in FIG. 10B includes columns for storage of detailed information for a job of which the job type is a print job. The print and detailed job log table 1010 includes columns for storage of a detailed job log ID 1011, a print page number 1012, a duplex setting 1013, an N up setting 1014, a color page number 1015, a monochrome page number 1016, and a page size 1017. That is to say, the print and detailed job log table 1010 stores the various attribution values for the print job in addition to the print page number. Therefore, the stored attribution value is not limited to the attribution described above, and may be stored as an arbitrary attribution value.

The scan and detailed job log table 1020 illustrated in FIG. 10C is a table configured to store detailed information about a job in which the job type is a scan. The scan and detailed job log table 1020 includes columns for storage of a detailed job log ID 1021, a page size 1022, a color page number 1023, a monochrome page number 1024, a file format 1025, and an address 1026. That is to say, the scan and detailed job log table 1020 stores the various attribution values for the scan job in addition to the page size.

FIG. 11 illustrates a power amount log table 1100. The power amount log table 1100 includes a device serial ID 1101, an object period commencement date time 1102, an object period completion date time 1103, and a power consumption amount 1104. The power consumption amount 1104 indicates the power amount that was consumed by the image forming apparatus that has the relevant device ID in the period from the object period commencement date time 1102 to the object period completion date time 1103. The power amount log table 1100 manages the power consumption amount associated with the device serial ID 1101.

FIG. 12A and FIG. 12B illustrate a tenant tallying setting table 1200, and a count and job log tallying results table 1210. The tenant tallying setting table 1200 illustrated in FIG. 12A includes columns for storage of a year commencement month 1201, a daily closing time 1202, and a monthly closing day 1203. The year commencement month 1201 determines which month shall be taken as the starting month for the year when performing annual calculations. In the present example, a year is taken to be the period from January to December. The daily closing time 1202 is the closing time used when performing daily tallying. In the present example, the range from 0:00:00 of the current day to less than 0:00:00 of the following day is taken to be the object of tallying for the current day. The monthly closing day 1203 determines which day shall be taken as the closing day of the tallying when performing monthly summaries. In the present example, the tallying object period for a month is the period from the 26$^{th}$ day of the previous month to the 25$^{th}$ day of the present month.

The tenant tallying setting table 1200 includes columns for storage of a applied time zone 1204, and a tallying commencement stand-by time 1205. Since a tallying and report is prepared for each client tenant, the time zone 1204 applied to the tallying is set in advance for each client tenant. The tallying commencement stand-by time 1205 is the read time for completing data collection from all image forming apparatuses in the tenant by the previous day based on the daily closing time 1202. In the present example, since the daily closing time of the tallying is 0:00, data collection from all the image forming apparatuses waits until 6:00:00, and executes a tallying in relation to the recorded data after 6:00:00.

The count and job log tallying results table 1210 illustrated in FIG. 12B includes columns for storage of a device serial ID 1211, and a tallying unit 1212. The count and job log tallying results table 1210 includes a tallying object year 1213, a tallying object month 1214, a tallying object day 1215, a tallying completion date time 1216, and a tallying status number 1217.

FIG. 13A and FIG. 13B illustrate a count and job log tallying table 1300 and a power amount tallying table 1310. The count and job log tallying table 1300 illustrated in FIG. 13A includes columns for storage of a device serial ID 1301, a tallying object day 1302, a total print sheet number 1303, a one-side print sheet number 1304, and a duplex print sheet number 1305. The count and job log tallying table 1300 furthermore includes an N up use ratio 1306 and a color use ratio 1307. The count and job log tallying table 1300 stores data obtained from the count table 910, the job log table 1000, the print and detailed job log table 1010, and the scan and detailed job log table 1020.

The power amount tallying table 1310 illustrated in FIG. 13B includes columns for storage of a device serial ID 1311, a tallying object date 1312, and a consumed power amount 1313. The power amount tallying table 1310 stores data obtained from the power amount log table 1100. The power amount tallying table 1310 manages the consumed power amount 1313 associated with the device serial ID 1311.

The count and job log tallying table 1300 and the power amount tallying table 1310 illustrate examples of tallying results for each image forming apparatus. The main purpose of the device management application is to enable comprehension and reporting of the use state, and therefore, a tallying is performed in relation to each device group by item, and a tallying is performed for each user in relation to the job log. Description has been given above that the original data for tallying includes the count and job log and the power amount log, and the tallying processing is performed in accordance with the settings for the tallying closing date time to thereby store the tallying values in the tallying results table. The count and job log example described herein is an example of an actually handled value. Thus, the various types of data may be handled as the tallying original data and tallying values.

The various tables described herein from 500 to 1310 are installed in the database 1321, for the purpose of executing recording, searching, summarizing, updating or deleting data from the Web application 301, or the application 311.

FIG. 14A to FIG. 14C respectively illustrate a data table for a database 411. A power point connection event record table 1400 illustrated in FIG. 14A includes columns for storage of the event occurrence date time 1401, a reader ID 1402, a power point ID 1403, an IC chip ID 1404, and a occurred event 1405. When the insertable plug 134 is connected to the power point 171, the reader 174 reads the IC chip ID from the IC chip 135 that is mounted in the image forming apparatus 132. The data transmission unit 421 sends the event occurrence date time, the reader ID, the IC chip ID, and the occurred event (connection completed) to the data recording unit 403. The data recording unit 403 adds a record to the power point connection event record table 1400 and records a value for the received data in each column. When the connection of the insertable plug 134 from the power point 171 is disconnected, in the same manner, the disconnection is recorded as an occurred event. The reader 174 may be configured to read the device serial ID of the image forming apparatus, this configuration enables management by linkage with the IC chip ID and the device serial ID on the power management device side.

The power amount record table 1410 illustrated in FIG. 14B includes columns for storage of a power point ID 1411, an object period-commencement date time 1412, an object period-completion date time 1413, and a consumed power amount 1414. The power meter 175 measures the power used in the power point 171, and for example, transmits a one-minute unit power amount from the data transmission unit 422 to the data recording unit 403. The data recording unit 403 adds the received power amount data as a record to the power amount record table 1410. In this manner, the power management server 161 can comprehend how much power amount is consumed at each power point. The power management server 161 refers to a combination of the power point ID and the IC chip ID of the power point connection event record table 1400 as described above. In this manner, the power management server 161 can comprehend how much power amount is consumed by each image forming apparatus that mounts a given IC chip ID.

The power point disposition information table 1420 illustrated in FIG. 14C includes columns for storage of a power point ID 1412 and disposition information 1 to 4 (1422, 1423, 1424, 1425). The power point disposition information table 1420 is a table for management of the disposition position of each power point when the each power point is disposed in a building. In the present example, location information is recorded as disposition information 1, building information is recorded as disposition information 2, floor information is recorded as disposition information 3, and area information is recorded as disposition information 4. The power management server 161 links the disposition information with the power point ID to thereby comprehend the installation site of a power point. Furthermore, upon comparison with the power point connection event record table 1400, the installation site of the image forming apparatus can be comprehended from the IC chip ID connected to the power point.

FIG. 15 illustrates a sequence figure that describes the flow of data record processing. The data transmission unit 343 of the image forming apparatus 132 periodically transmits a data record request for a count and job log collected by the counter 335 to the data recording unit 304 of the Web application 301 (S1501). The data recording unit 304 records the received count and job log in the count table 910, the job log table 1000 and the detailed job log table 1010, 1020 of the database 321 (S1502). Then the final data updating date time 903, indicating the date time by which count and job log data was collected, is recorded in the device data updating date time table 900. The data recording unit 304 returns a response to the data recording request to the data transmission unit 343 in relation to success or failure or the like (S1503).

On the other hand, the data transmission unit 421 of the reader 174 transmits data such as the occurred event, the IC chip ID or the like to the data recording unit 403 of the Web application 401 when power point connection completion or disconnection is detected (S1511, S1512). The data recording unit 403 records the received event data in the power point connection event record table 1400 of the database 411 (S1513). The data recording unit 403 returns a response to the data recording request to the data transmission unit 421 in relation to success or failure or the like (S1514). The data transmission unit 422 of the power meter 175 periodically transmits data such as the measured power amount data used by the power point and a power point ID or the like to the data recording unit 403 (S1521). The data recording unit 403 records the received power amount data in the power amount record table 1410 of the database 411 (S1522). The data recording unit 403 returns a response to the data recording request to the data transmission unit 422 in relation to success or failure or the like (S1523).

The data import unit 312 acquires a list of the device serial IDs from the device management table 800 for a specific tenant, and acquires the IC chip ID corresponding to the acquired device serial ID from the device IC chip information management table 510 (S1531). The data import unit 312 uses the information for the tenant in the tenant data management table 700 to connect to the data acquisition unit 404, and uses the IC chip ID of the respective image forming apparatuses as a detection condition to transmit an acquisition request for the power amount data (S1532). That is to say, the data import unit 312 requests the power management system for information related to the consumed power for the image forming apparatus. The data acquisition unit 404 searches the power amount record table 1410 of the database 411 and acquires power amount data used by the image forming apparatus mounting the IC chip ID specified as the search condition (S1533). The data acquisition unit 404 forwards the acquired power amount data to the data import unit 312 (S1534). The data import unit 312 records the received power amount data in the power amount log table 1100 of the database 321 (S1535).

Figure 16:
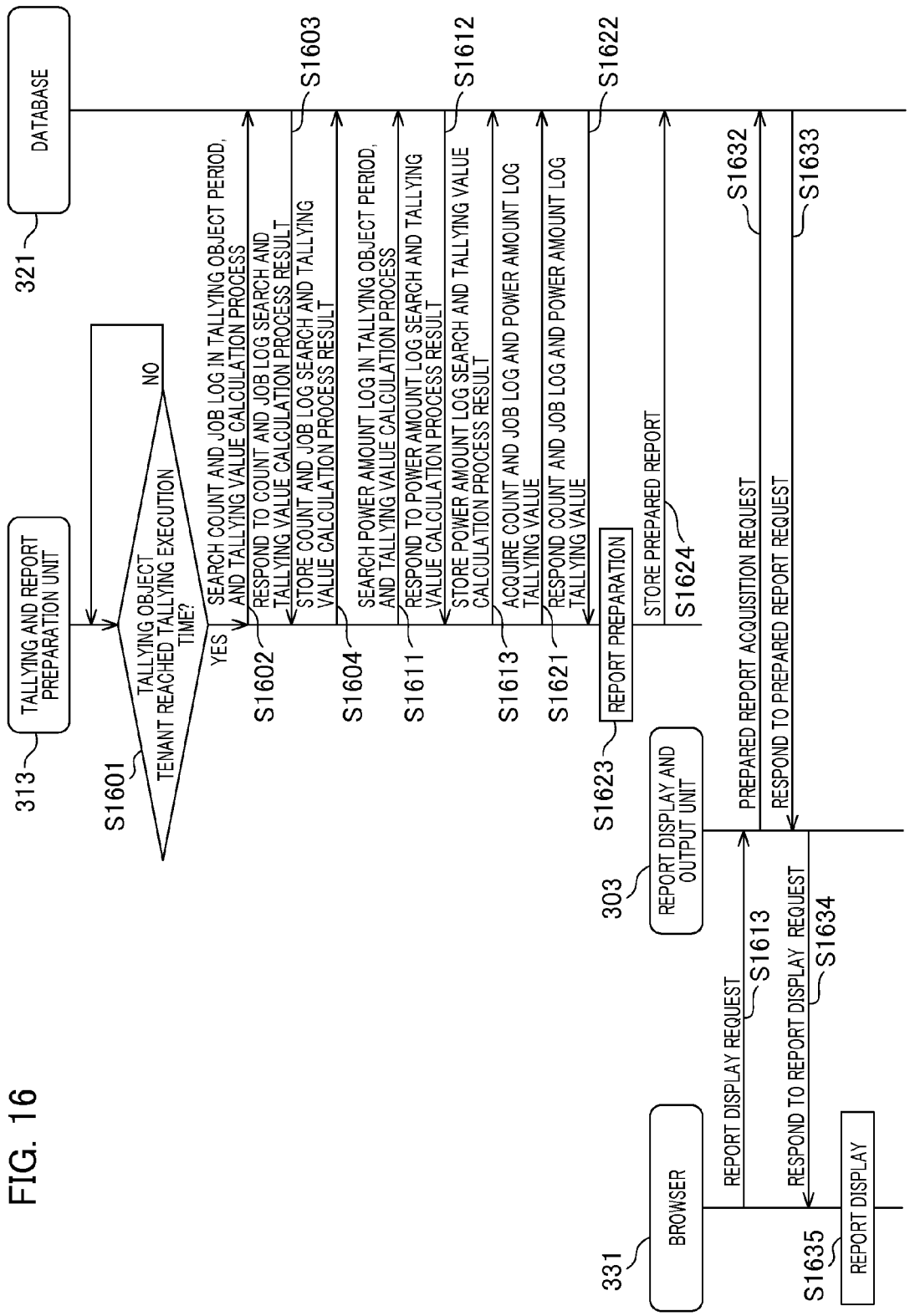
FIG. 16 illustrates a sequence figure that describes the flow of tallying and report preparation processing.

FIG. 16 illustrates a sequence figure that describes the flow of tallying and report preparation processing in the Web application 301 and the application 311. The example illustrates a tallying and report preparation process for a tenant ID AAA00002.

The tallying and report preparation unit 313 refers to the tallying commencement stand-by time 1205 in the tenant tallying setting table 1200 for the tenant ID AAA00002, and determines whether the tallying object tenant has reached the tallying execution time (S1601). In the present embodiment, when the execution time in S1601 is 6:00:00, the tallying and report preparation unit 313 determines a response of Yes, and the tallying and report preparation unit 313 of the application 311 executes tallying and report preparation by performing the following processing steps in relation to each tenant.

Firstly, the tallying and report preparation unit 313 performs a search and tallying value calculation process using the database 321 in relation to the count and job log during the tallying object period (S1602). The database 321 searches the respective records of the tallying object period using the count table 910, the job log table 1000, and the detailed job log table 1010 for the tenant ID AAA00002. The database 321 returns the detection results as the measurement processing results for the measurement values (S1603). The tallying and report preparation unit 313 performs calculation processing on the count and job log for the tallying object period based on the respective reports received as tallying value calculation processing results. The tallying and report preparation unit 313 stores the tallying values obtained as the results of the calculation processing in the count and job log tallying table 1300 of the database 321 (S1604). The tallying and report preparation unit 313 records the tallying object period in relation of which the tallying has been completed in the count and job log tallying results table 1210.

Next, the tallying and report preparation unit 313 performs a search and tallying value calculation process using the database 321 for the power amount during the tallying object period (S1611). The database 321 searches the power amount log table 1100 for the respective records during the tallying object period, and returns a response of the calculation processing results for the tallying values (S1612). The tallying and report preparation unit 313 performs calculation processing for the consumed power amount during the tallying object period based on the respective received records. The tallying and report preparation unit 313 records the tallying value calculation processing results, that have been obtained as results during calculation processing, in the power amount tallying table 1310 of the database 321 (S1613).

The tallying and report preparation unit 313 acquires the tallying value for the power amount log and the count and job log from the database 321 (S1621) by a request. The database 321 searches the count and log job tallying table 1300 and the power amount tallying table 1310 and responds with the tallying value (S1622). The tallying and report preparation unit 313 adjusts the tallying values for the received count and job log and power amount log in the report to thereby prepare the report file (S1623). That is to say, the tallying and report preparation unit 313 executes the tallying process based on the information related to the consumed power and the information related to the job. When the report file is realized by a data file such as a CSV, a table or a graph, or the like, the file may be office file data, a PDF, or the like. The tallying and report preparation unit 313 records the prepared report file in the database 321 so that a user searches and acquires it (S1624).

Then, the browser 331 transmits the report display request to the report display and output unit 303 of the Web application (S1631). The report display and output unit 303 transmits an acquisition request for the prepared report to the database 321 (S1632). The database 321 responds with the report file prepared in S1624 to the report display and output unit 303 (S1633). The report display and output unit 303 responds with the received report file to the browser 331 (S1634). The browser 331 displays the received report file (S1635). The description to this point is the tallying flow of the normal count, job log and power amount log.

FIG. 17 illustrates a data table stored in the database 321. The model-specific power consumption information table 1700 includes columns for storage of a model name 1701, and a power consumption 1702, 1703, 1704 during the stand-by mode, during the power economy 1 mode, and the power economy 2 mode. The stand-by mode is the operational mode in which warm-up is completed to thereby enable immediate commencement of print output. The power economy 1 mode (first power mode) is the mode that is operated so that warm-up is completed in a minimum time, although warm-up has not been completed as in the stand-by mode. Furthermore, it is the state in which the minimum power amount is supplied required for processing by the application in the image forming apparatus in response to the information processing functions. The power economy 2 mode (second power mode) is the operational mode in which the image forming apparatus applies a current only to units that respond to a communication from the network and all other power is cut off to thereby maximize power economy. In this configuration, since the application in the image forming apparatus cannot execute processing, when processing execution by an application is required, a transition to the power economy 1 mode or higher is performed.

Figure 18:
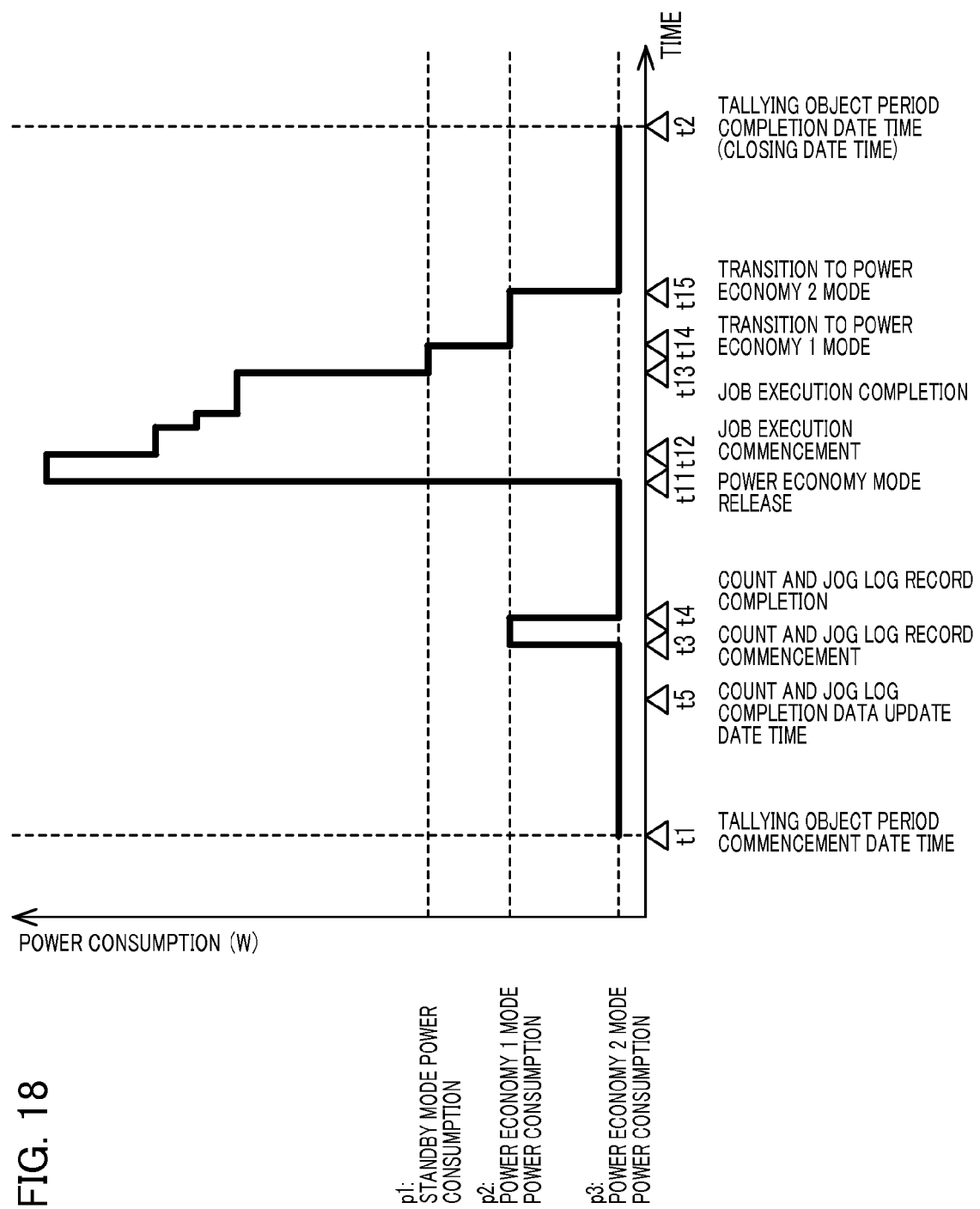
FIG. 18 illustrates an example of a power consumption graph.

FIG. 18 illustrates a graph expressing the variation in the power consumption of a given image forming apparatus as a time series. The denotations t1 and t2 are the tallying object period start date time and the tallying object period completion date time. For example, when May 25 is the tallying object date, and the tallying closing time is 0:00:00, t1=5/25, 0:00:00, and t/2=5/26, 0:00:00. The denotation t3 is the date time at which recording is started by the image forming apparatus of the count and job log into the data recording unit 304. The denotation t4 is the date time at which recording of the count and job log is completed. As shown by t3 and t4, during the recording processing of the count and job log, the image forming apparatus uses power economy 1 mode, that is to say, the image forming apparatus communicates with the device management application while suppressing power consumption. The denotation t5 is the final data updating date time 903 for the count and job log that has been completely recorded at t4.

The denotation t11 is the date time on which the image forming apparatus has released the power economy mode due to arrival of a job or the like. The denotation t12 is the date time on which the image forming apparatus has commenced a job execution. The denotation t13 is the date time on which the image forming apparatus has completed the job execution. The denotation t14 is the date time on which the image forming apparatus has switched a mode to the power economy 1 mode. The denotation t15 is the date time on which the image forming apparatus has switched a mode to the power economy 2 mode. The denotation p1 is the stand-by mode time power consumption 1702 of the mode of the image forming apparatus. In the same manner, the denotation p2 is the power economy 1 mode power consumption 1703. Furthermore, in the same manner, the denotation p3 is the power economy 2 mode power consumption 1704.

Figure 19:
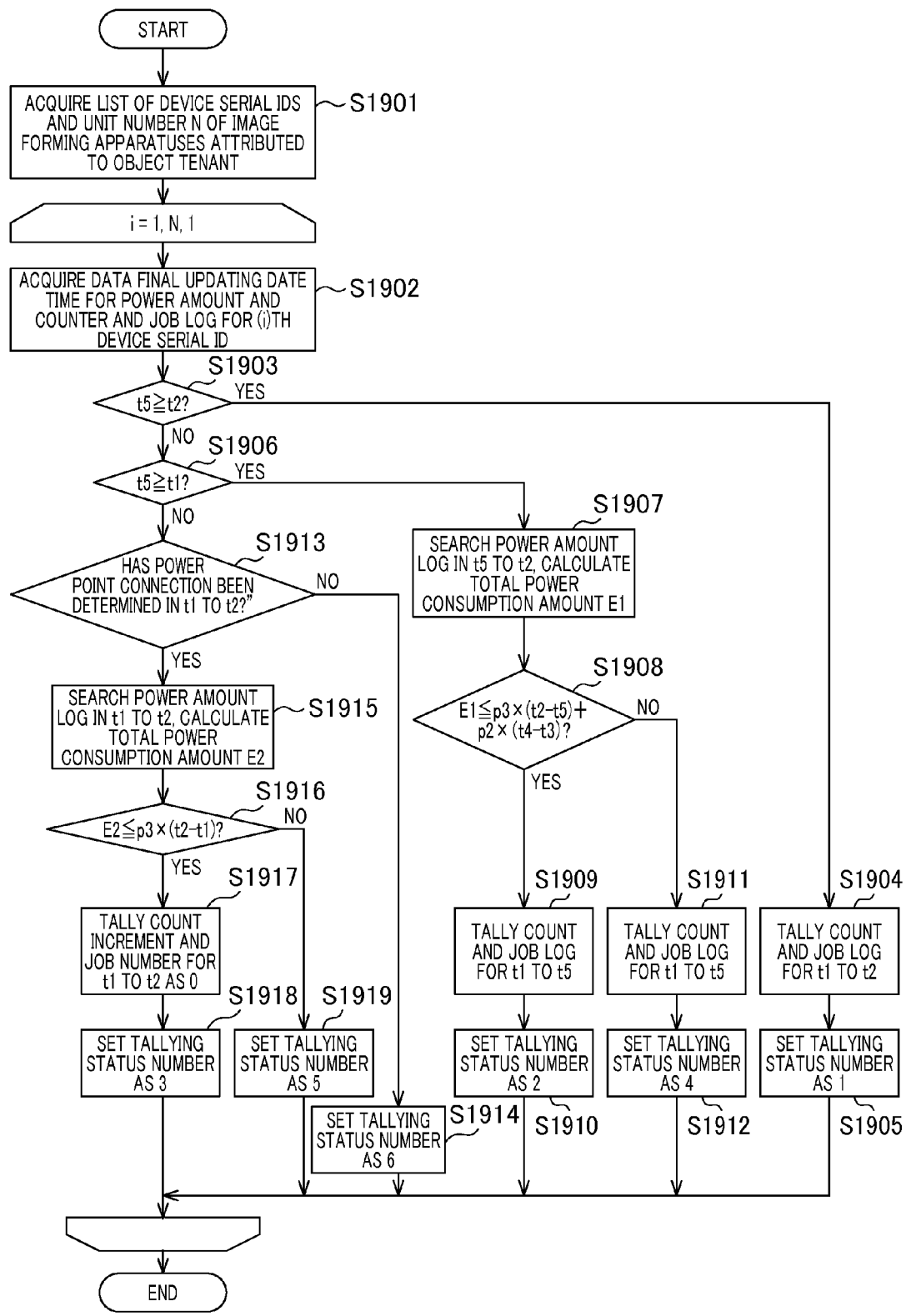
FIG. 19 illustrates a flowchart of the tallying processing performed by the tallying and report preparation unit.

FIG. 19 illustrates a flowchart describing the flow of processing performed by the device management application 121 during execution of searching and tallying value calculation for the count and job log, and recording of the processing results in the database 321 (S1602 to S1604). That is to say, these processing steps enable updating of the tallying information for the image forming apparatus that has not transmitted data. The tallying and report preparation unit 313 refers to the device management table 800 for a given tenant and acquires a list of device serial IDs and the number of units N of image forming apparatus that are attributed to AAA00002 (S1901). In the following description, continuous processing is repetitively executed in relation to individual device serial IDs. The tallying and report preparation unit 313 refers to the device data updating date time table 900 and acquires the data final updating date time for the power amount and the count and job log for the (i)th device serial ID (S1902).

The tallying and report preparation unit 313 determines whether t5≥t2, that is to say, whether the final data updating date time has exceeded the tallying object completion date time (S1903). For example, when the final updating date time is May 26, and the tallying object completion date time is May 25, the determination in the S1903 is Yes. In this case, a tallying of the required count and job log is completed in relation to the tallying object period t1 to t2, that is to say, the tallying object period is completed. Therefore, the tallying and report preparation unit 313 executes a tallying using the count and job log for t1 to t2 (for example, for May 25) (S1904). Furthermore, the tallying and report preparation unit 313 sets a value of "1" as the tallying status number 1217 illustrated in FIG. 12B (S1905). The status will be described below making reference to FIG. 20.

When the determination in S1903 is No, the final data updating date time has not exceeded the tallying object completion date time. That is to say, this indicates that due to some reason, the count and job log has not been transmitted by the image forming apparatus, and data updating has not occurred. Then the tallying and report preparation unit 313 determines whether t5≥t1, that is to say, whether the final data updating date time has exceeded the tallying object period commencement date time (S1906). When the determination in the S1907 is Yes, the tallying and report preparation unit 313 searches the power amount log table 1100 for the power amount log from t5 to t2, to thereby calculate a total consumption power amount E1 (S1907). The tallying and report preparation unit 313 determines whether or not a first reference value has been exceeded. That is to say, the tallying and report preparation unit 313 determines that $E1 \leq p3 \times (t2-t5) + p2 \times (t4-t3)$ (S1908). When the determination in the S1908 is No, the image forming apparatus executes count and job log recording at the tallying object period date time (for example, May 25), and therefore, power is consumed by the recording processing. Therefore, when the determination in S1908 is No, it is determined that power that is greater than or equal to p1 for execution of the job has been used in addition to the power used during count and job log record processing in t3 to t4. When the determination in S1908 is Yes, it is determined that the image forming apparatus is operating in power economy 2 mode in time intervals other than t3 to t4, and that there is no executed job. Consequently, the tallying and report preparation unit 313 executes the tallying using the count and job log that has been recorded in t1 to t5 (S1909). Then the value of "2" is set as the tallying status number 1217 (S1910).

When the determination in S1908 is No, it can be determined that there is a possibility that some type of job has been executed in the period from t5 to t2. Consequently, the tallying and report preparation unit 313 executes the tallying using the count and job log that is recorded in t1 to t5 (S1911). Then the value of "4" is set as the tallying status number 1217 (S1912).

When the determination in S1906 is No, the tallying and report preparation unit 313 uses the data acquisition unit 404 to search the power point connection event record table 1400 through the data import unit 312, and determines the presence or absence of a power point connection during the interval t1 to t2 (S1913). When the determination in S1913 is No, since the image forming apparatus is determined to not have had a power point connection during the interval t1 to t2, a value of "6" is set as the tallying status number 1217 (S1914).

When the determination in S1913 is Yes, the tallying and report preparation unit 313 searches the power amount log in the interval t1 to t2 in the power amount log table 1100, to thereby calculate a total power consumption E2 (S1915). The tallying and report preparation unit 313 determines whether or not a second reference value, that is a value calculated by multiplying the time from t1 to t2 by the power consumption amount per unit time, has been exceeded. That is to say, the tallying and report preparation unit 313 determines whether $E2 \leq p3 \times (t2-t1)$ (S1916). When the determination in S1917 is Yes, the tallying and report preparation unit 313 determines that a job has not been executed in the interval t1 to t2. Consequently, the tallying is executed by making the count increment value for t1 to t2 take a value of zero, and the job number take a value of zero (S1917). Then the tallying and report preparation unit 313 sets a value of "3" as the tallying status number 1217 (S1918). When the determination in S1916 is No, the tallying and report preparation unit 313 determines that there is a possibility that a job has been executed in the interval t1 to t2. Consequently, a value of "5" is set as the tallying status number 1217 (S1919).

FIG. 20 illustrates a table of a list of the tallying status of each tallying status number, and the meaning thereof. As a result of the determination and the branching of the flowchart illustrated in FIG. 19, even when looking up the power log of the image forming apparatus indicates there is an image forming apparatus that cannot update data due to currently operating in power economy 2 mode, tallying closing processing can be executed (numbers 2 and 3). Conversely, an apparatus that is associated with the possibility of execution of a job based on the power log of the image forming apparatus can be indicated as an image forming apparatus that may have been omitted from the tallying (number 4 and 5). Therefore, notwithstanding the fact that the image forming apparatus is attributed to a tenant, a determination of is possible during the tallying object interval as an image forming apparatus without a power point connection and in an uncertain state (number 6).

The processing described above enables performance of tallying processing even when the image forming apparatus does not transmit data to the device management server when the power source is OFF or during power economy mode, and thereby enables updating of information. When the used power of the image forming apparatus during the interval t1 to t2, or t5 to t2 is known, and a determination is performed in relation to whether or not there has been a momentary use of power of at least p2 at an interval other than t3 to t4, it is possible to detect that there is the possibility that a job has been executed. However, considerations of the data amount mean that it is not realistic to record power usage for all times by the image forming apparatus 132. Thus, in the present embodiment, the recorded power amount is used to determine whether or not there has been power usage as a result of job execution. When the interval from t1 to t2 is excessively long, the incremented value for p3 takes a large value, and therefore it is considered that the determination accuracy of power usage associated with job execution is adversely affected. In this case, the steps from S1908 to S1916 in the present example may be divided into smaller intervals for performance of sequential determination.

For example, when t1 to t2 is one day, the determination frame may divide t1 to t2 into one hour units, to thereby execute a similar determination of the 24 determination frames in relation to whether or not power usage has occurred due to job execution. When it is determined that power usage resulting from job execution occurred in any of the determination frames, it can be determined that there is a possibility that a job was executed in the interval t1 to t2. Although the power amount may be recorded by increasing the fine division of the determination frame for increasing the determination accuracy, it is preferred to determine a determination frame by taking a balance since the disadvantages are caused by the relative increase in the data capacity resulting from maintaining a detailed data record.

As described above, the device management system of the present disclosure enables acquisition from the power management system of power consumption used by an image forming apparatus for the suitable updating and management of power consumption.

Next, an additional problem that is solved by the present disclosure will be described. The device management application may be used for tallying and report preparation for each device group taken as a single tallying unit. For example, a device group may be configured in relation to each office room in a corporate environment to thereby enable comprehension of the use state of the device group. At a given time, a given image forming apparatus 132 is taken to be moved from room A to room C. At this time, when the device group information for the image forming apparatus is not suitably updated, the use state of the image forming apparatus continues to execute tallying and report as the device group for room A. This type of updating operation of the device group information is troublesome for management personnel, and in the case where the execution of the updating operation is overlooked, that correct tallying and report preparation potentially cannot be performed.

FIG. 21A to FIG. 21C respectively illustrate a group-to-be-transferred information table 2100, a transferred-group information table 2110, and a conversion information table 2120 of a database 321 that manages event information. The group-to-be-transferred information table 2100 illustrated in FIG. 21A includes columns for storage of disposition information 1 to 4 (2101 to 2105) corresponding to 1422 to 1425, and a group ID 2101. The transferred-group information table 2110 illustrated in FIG. 21B includes columns for storage of a first to third device group (2112 to 2114) corresponding to 812 to 814, and a group ID 2111. The conversion information table 2120 illustrated in FIG. 21C includes 2122 as a transferred-group ID corresponding to reference numeral 2111 and a group-to-be-transferred group ID 2121 corresponding to reference numeral 2101.

Figure 22:
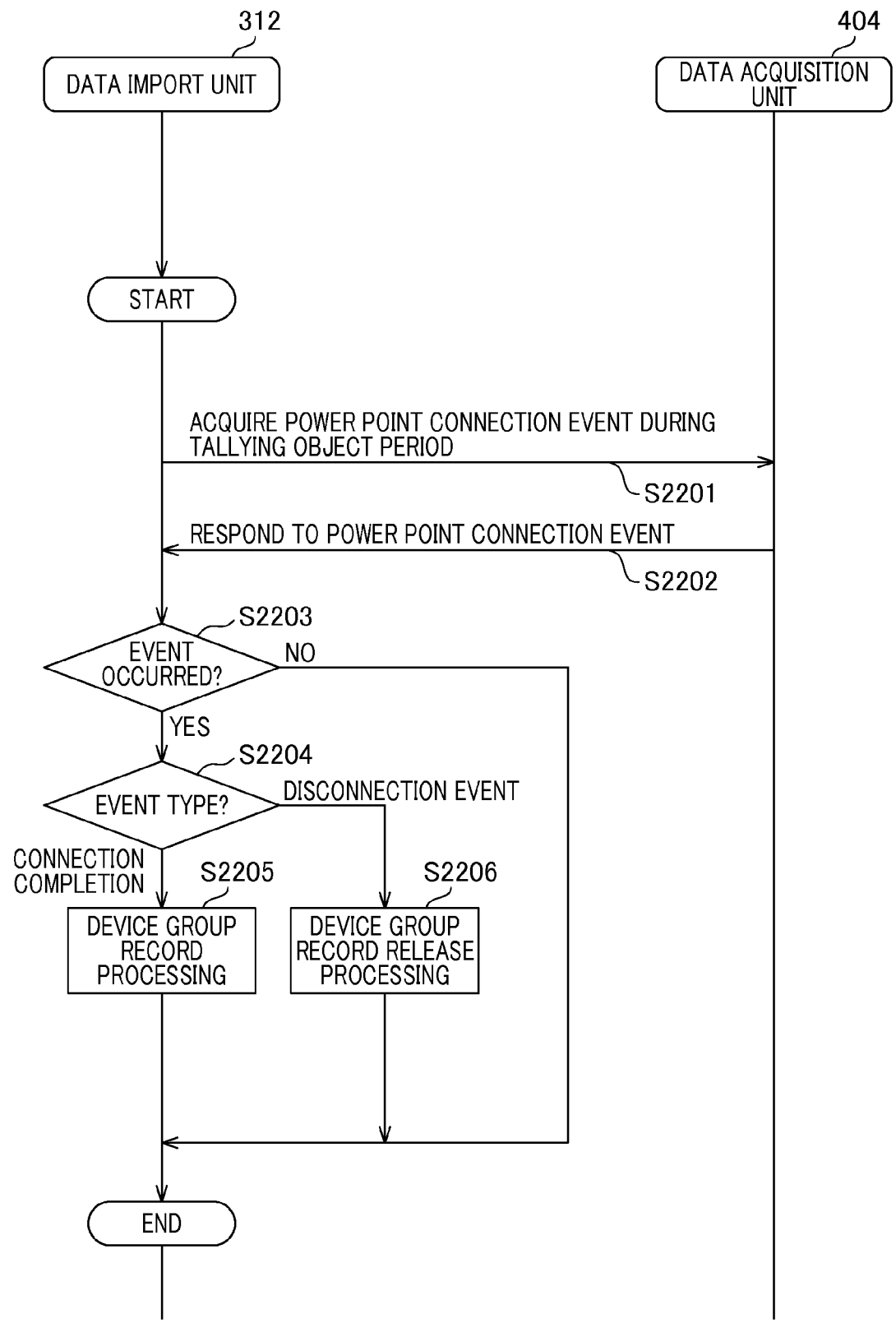
FIG. 22 is a flowchart of the power point connection event acquisition process.

FIG. 22 is a flowchart of updating of the device group information. The data import unit 312 acquires a occurred event in the image forming apparatus 132 that is attributed to a tenant from the data acquisition unit 404 (S2201). The data acquisition unit 404 of the power management server 161 at this time uses the IC chip ID as a search condition to search the power point connection event record table 1400 for a occurred event during the tallying object interval. The data acquisition unit 404 responds with the presence or absence of the power point connection event to the image forming apparatus (S2202).

When there is an event, the data acquisition unit 404 responds with the event occurrence date time 1401, the power point ID 1403, the occurred event type 1405, or the like. Furthermore, the data acquisition unit 404 looks up the power point disposition information table 1420, and responds with the disposition information 1 to 4 (1422 to 1425) corresponding to the power point ID. The data import unit 312 determines the presence or absence when an event has been produced (S2203). When the determination in S2203 is No, a particular processing step is not performed. When the determination in S2203 is Yes, the event type is determined (S2204).

When the determination in S2204 indicates a connection completion event, the data import unit 312 adds a record for the image forming apparatus to the device group management table 810 (S2205). At this time, the result obtained by conversion of the disposition information 1 to 4 is stored by the conversion information table 2120 based on the response received from the data acquisition unit 404 in the first to the third device groups (812 to 814). The data import unit 312 stores the event occurrence date time 1401 as the device group record date time 815.

When the determination in S2204 indicates a disconnection event, the data import unit 312 deletes the record of the image forming apparatus in the device group management table 810 after moving it to the device group active table 820 (S2206). Furthermore, the event occurrence date time 1401 is stored as the device group record release date time 826. As described above, it is possible to detect the connection completion or the disconnection of the image forming apparatus to/from the power point, and thereby automatically and accurately reflect the attributed device group. In this manner, the device management system can update device group information and correctly prepare a tallying and report.

Aspects of the present disclosure can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2012-173271 filed Aug. 3, 2012, which is hereby incorporated by reference herein in its entirety.

What is claimed is:

1. A device management system that communicates through a network with a power management system that associates identification information for identifying a configuration for power supply with a plurality of electronic devices that includes at least one image forming apparatus to thereby manage power consumption consumed by the plurality of electronic devices, the device management system comprising:
   a first management unit configured to manage specific information for specifying each image forming apparatus of a plurality of image forming apparatuses that is an object of management;
   a second management unit configured to manage identification information corresponding to each image forming apparatus by association with the specific information for specifying each image forming apparatus;
   a request unit configured to request the power management system for information related to power consumption of each image forming apparatus by use of the identification information that is managed by the second management unit; and
   a third management unit configured to manage the information related to power consumption acquired by the request unit by association with the specific information for specifying each image forming apparatus,
   wherein the identification information that identifies the configuration of the power supply is identification information read from an IC chip.

2. The device management system according to claim 1 further comprising:
   an acquisition unit configured to periodically acquire log information from each image forming apparatus in relation to a job executed by each image forming apparatus;
   a fourth management unit configured to manage the acquired log information by association with the specific information for specifying each image forming apparatus; and
   an execution unit configured to execute a tallying process based on information related to the acquired log information and the power consumption.

3. The device management system according to claim 2 further comprising:
   a preparation unit configured to prepare a report in relation to used power and the job executed by each image forming apparatus on the basis of the tallying process.

4. The device management system according to claim 1, wherein the specific information for specifying each image forming apparatus indicates at least any of serial information, address information or model information for each image forming apparatus.

5. A control method in a device management system that communicates through a network with a power management system that associates identification information for identifying a configuration for power supply with a plurality of electronic devices that includes at least one image forming apparatus to thereby manage power consumption consumed by the plurality of electronic devices, the method comprising the steps of:
   managing specific information for specifying each image forming apparatus of a plurality of image forming apparatuses that is an object of management;

managing identification information corresponding to each image forming apparatus by association with the specific information for specifying each image forming apparatus;

requesting information related to power consumption of each image forming apparatus from the power management system by use of the managed identification information; and managing the information related to power consumption acquired in the requesting step by association with the specific information for specifying each image forming apparatus, wherein the identification information that identifies the configuration of the power supply is identification information read from an IC chip.

6. The control method according to claim 5 further comprising the step of:

periodically acquiring log information from each image forming apparatus in relation to a job executed by each image forming apparatus;

managing the acquired log information by association with the specific information for specifying each image forming apparatus; and executing a tallying process based on information related to the acquired log information and the power consumption.

7. The control method according to claim 6 further comprising the step of:

preparing a report in relation to used power and the job executed by each image forming apparatus on the basis of the tallying process.

8. The control method according to claim 5, wherein the specific information for specifying each image forming apparatus indicates at least any of serial information, address information or model information for each image forming apparatus.

9. A non-transitory computer-readable storage medium on which is stored a computer program for making a computer execute a control method in a device management system that communicates through a network with a power management system that associates identification information for identifying a configuration for power supply with a plurality of electronic devices that includes at least one image forming apparatus to thereby manage power consumption consumed by the plurality of electronic devices, the method comprising the steps of:

managing specific information for specifying each image forming apparatus of a plurality of image forming apparatuses that is an object of management;

managing identification information corresponding to each image forming apparatus by association with the specific information for specifying each image forming apparatus;

requesting information related to power consumption of each image forming apparatus from the power management system by use of the managed identification information; and managing information related to power consumption acquired in the requesting step by association with the specific information for specifying each image forming apparatus, wherein the identification information that identifies the configuration of the power supply is identification information read from an IC chip.

* * * * *